BISTABLE CIRCUIT

Filed Oct. 27, 1964

INVENTORS
EDWARD B. EICHELBERGER
MELVIN P. XYLANDER

BY John C. Black
ATTORNEY 3,284,645

BISTABLE CIRCUIT

Edward B. Eichelberger, Endicott, and Melvin P. Xylander, Apalachin, N.Y., assignors to International Business Machines Corporation, Armonk, N.Y., a corporation of New York Filed Oct. 27, 1964, Ser. No. 406,692

9 Claims. (Cl. 307—88.5)

This invention relates generally to an improved bistable device and more particularly, to an improved bistable device which is particularly useful in binary counters, registers and the like.

The design of reliable, inexpensive high speed bistable devices with D.-C. input coupling has been characterized by particularly troublesome problems. The occurrence of both static and sequential hazards in circuits of this type has resulted in unreliability in simplified devices; and those working in the art have resorted to the provision of additional logic gates, synchronizing pulse systems and A.-C. coupling to achieve reliability. However, in achieving reliability in this manner, additional cost and circuit complexity necessarily arise.

Accordingly, it is a primary object of the present invention to provide an improved D.-C. coupled bistable device.

Another important object of the present invention is the provision of an improved D.-C. coupled bistable device capable of operation at high speeds.

Another important object of the present invention is the provision of an improved bistable device which is particularly well adapted for implementation by microminiaturized integrated circuit fabrication.

Another important object is the provision of an improved binary counter.

These objects are achieved in a preferred form of the present invention by the provision of a bistable device including a pair of transistor inverters of the same conductivity type, each of which has inverters of the same comprising a pair of AND circuits, the outputs of which are connected to an OR circuit which in turn is connected to the input of the inverter. The collector electrode of each inverter is crosscoupled to one input of each AND circuit associated with the other inverter. A delay means is provided in one AND circuit of each pair to delay the change in potential at the output of the AND circuit for reasons set forth below, the delay means in the preferred embodiment being a capacitor. The capacitor is preferably crosscoupled between each inverter and the output of a predetermined one of the pair of AND circuits associated with the other inverter. One of a pair of complemented inputs is applied to an input of each predetermined AND circuit, and the other complemented input is applied to the other inputs of the other AND circuits.

In each D.-C. stable state of the device, one of the inverters partially satisfies the input logical function of both AND circuits to which it is crosscoupled. Since the other inputs of this pair of AND circuits are connected to complemented inputs, the function of one AND circuit is satisfied. When the complemented input signal levels change from one logical value to the other, a static hazard condition arises at the input of the associated OR circuit by reason of one AND circuit in the pair changing to its unsatisfied condition and the other to its satisfied condition. For example, if the unsatisfied AND function becomes satisfied prior to the satisfied AND function becoming unsatisfied, no change appears at the output of the OR circuit. However, if the opposite sequence occurs, a momentary change in level (static hazard pulse) occurs at the output of the OR circuit.

In accordance with the present invention, the delay circuit (e.g., capacitor) guarantees a hazard pulse of sufficient time duration to switch the bistable device from one D.-C. stable state to the other.

In the illustrated embodiment, each positive going transient applied to the predetermined AND circuits is delayed by one of the capacitors to cut off the inverter which is conducting, thereby to initiate a change in the D.-C. stable state of the device.

It is therefore another object of the present invention to provide an improved bistable device in which switching of the device is achieved by means of a guaranteed hazard pulse of sufficient time and level duration.

The foregoing and other objects, features and advantages of the invention will be apparent from the following more particular description of preferred embodiments of the invention, as illustrated in the accompanying drawings.

Figure 2:
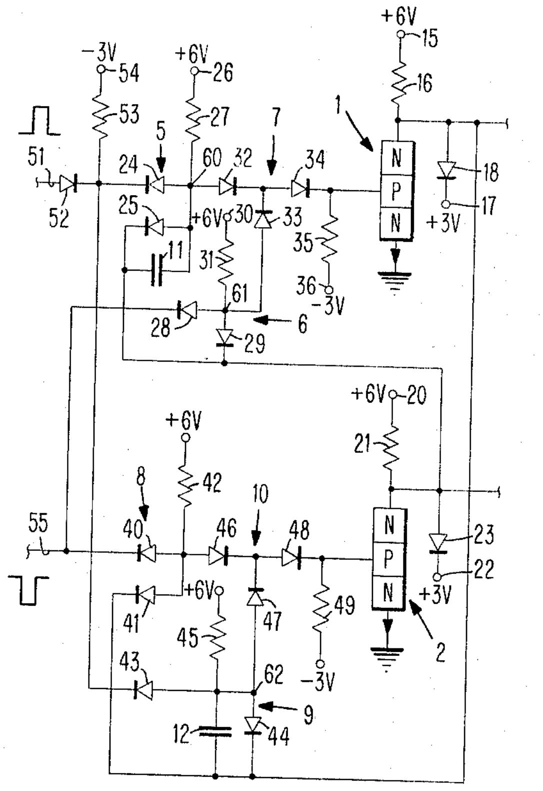
FIG. 2 shows one embodiment of the circuit of FIG. 1 in schematic form.
Figure 1:
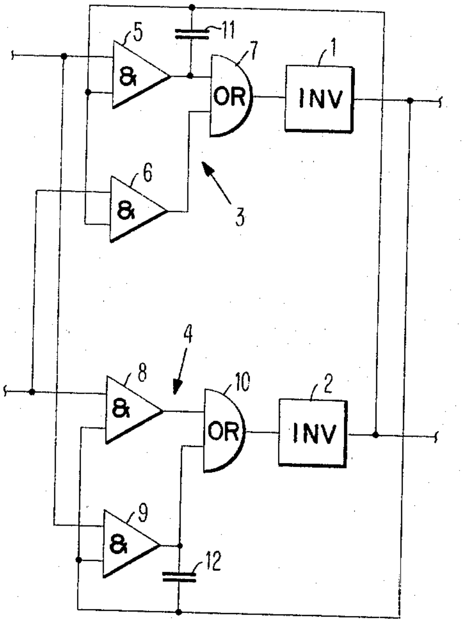
FIG. 1 shows a circuit in diagrammatic form embodying the principles of the present invention.

The improved bistable device of FIGS. 1 and 2 includes a pair of transistor inverters 1 and 2 and a pair of logical input circuits 3 and 4. The logical input circuit 3 includes a pair of AND circuits 5 and 6, the outputs of which are connected to a CR circuit 7. The OR circuit 7 is connected to the input to the inverter 1.

The logical input circuit 4 is a mirror image of the logical input circuit 3 and includes a pair of AND circuits 8 and 9 and an OR circuit 10.

An integrating capacitor 11 is crosscoupled between the output of the inverter 2 and the output of the AND circuit 5. A capacitor 12 is crosscoupled between the output of the inverter 1 and the output of the circuit 9.

Referring more particularly to FIG. 2, the transistor inverters 1 and 2 are illustrated as NPN transistors. The collector electrode of the transistor inverter 1 is coupled to a positive bias terminal 15 by way of a resistor 16 and to a lower positive bias terminal 17 by way of a clamping diode 18.

The collector electrode of the transistor inverter 2 is connected to a positive bias supply terminal 20 by way of a resistor 21 and to a lower positive bias supply terminal 22 by way of a clamping diode 23.

Although the diodes 18 and 23 are not essential to the reliable operation of the bistable device, nevertheless they substantially improve the operation of the device during switching by assuring more precise control over the capacitor integrating action.

The positive AND circuit 5 includes a pair of diodes 24 and 25 connected to a positive bias supply terminal 26 by way of a resistor 27. The AND circuit 6 includes a pair of diodes 28 and 29 connected to a positive bias supply terminal 30 by way of a resistor 31. The OR circuit 7 includes a pair of input diodes 32 and 33, an isolating diode 34 and a resistor 35. One terminal of the resistor 35 is connected to the base electrode of the inverter 1 and the other terminal is connected to a negative bias supply terminal 36.

In the logical input circuit 4 which is the mirror image of the logical input circuit 3, the AND circuit 8 includes a pair of diodes 40 and 41 and a resistor 42; the AND circuit 9, a pair of diodes 43 and 44 and a resistor 45; and the OR circuit 10, input diodes 46 and 47, an isolating diode 48 and a resistor 49. A first complementary input conductor 51 is connected to the cathodes of the diodes 24 and 43, preferably by way of a diode isolation network including a diode 52 and a resistor 53 coupled to a negative supply terminal 54 included in FIG. 2 but not FIG. 1. A second complementary input conductor 55 is connected to the cathodes of the diodes 28 and 40.

Assume that the inverter 1 is conducting at saturation and that the inverter 2 is cut off. The collector electrode of the transistor 1 will be at ground potential and this ground potential will be applied to the diodes 44 and 41 to establish a negative reversed biasing potential at the base electrode of the inverter 2. The collector electrode of the inverter 2 will be at a potential supplying more positive +3 volts by reason of the forward biased diode 23 and this positive potential is applied to the diodes 25 and 29 and to one terminal of the capacitor 11.

It will be assumed further that the normal level of the input signal on the input conductor 51 is relatively negative, i.e. ground potential and that the level of the input signal on the conductor 55 is relatively positive, i.e. +3 volts. The positive potentials applied to the diodes of the AND circuit 6 causes the OR circuit 7 to apply a positive forward biasing potential to the base electrode of the inverter 3. It can be seen that the bistable device is in a D.-C. stable condition, and that the capacitor 11 is charged via diodes 24 and 23 and the resistor 53.

Assume that the input signal level on the conductor 51 goes to +3 volts and that the level of the input signal on the conductor 55 goes to ground. The positive going signal on the conductor 51 is applied to the diode 24. Since a positive potential is already applied to the diode 25 by the inverter 2, the output terminal 60 of the AND circuit 5 begins to rise positively; however, the output terminal 60 was previously at ground potential which caused the capacitor 11 to have a 3 volt charge across its terminals. Since the capacitor 11 must be discharged to permit the potential at the terminal 60 to rise positively, this rise in positive potential is delayed by the time constant of the capacitor 11 and the resistor 27.

On the other hand, the negative going signal on the conductor 55 causes the output terminal 61 to fall to ground potential almost instantaneously. The output potential of the OR circuit 7 is now determined by the potential level at the terminal 60 and the drop across the diodes 32 and 34 and the resistor 35. The slow rise in potential at the terminal 60 causes a negative static hazard pulse at the base electrode of the inverter 1, which begins to turn off.

The collector potential of the inverter 1 rises toward +3 volts and this positive transient is applied to the diode 44. It will be recalled that the positive going pulse on the conductor 51 has been applied to the diode 43. The capacitor 12 does not integrate the rise in voltage at the output terminal 62 of the AND circuit 9; and, in fact, the capacitor acts as a speed-up capacitor between the collector of the inverter 1 and the terminal 62.

The positive rise in potential at the collector electrode of the inverter 1 therefore applies a positive going pulse to the output terminal 62 of the AND circuit 9 to cause the OR circuit 10 to apply a positive forward biasing potential to the base electrode of the inverter 2 turning the latter on.

The collector electrode of the transistor 2 goes toward ground potential. This negative going pulse is applied to the diode 29, the capacitor 11 and the diode 25, and the capacitor 11 applies this pulse to the terminal 60 to drive the latter substantially below ground potential. Note that in this case the capacitor 11 acts as a speed-up coupling capacitor rather than as an integrator. This negative potential at the terminal 60 assures a very rapid turn off of the inverter 1. Subsequently the potential at the terminal 60 returns to ground within a time interval determined by the R-C time constant of the capacitor 11 and the resistor 27.

The bistable device has now assumed its other D.-C. stable condition. The return of the input signals to their initial values does not alter the stable condition of the device; however, the diode isolation network including the diode 52 and the resistor 53 if utilized in the circuit helps to minimize the low level noise signals which might appear at the output of the device when the input signal on the conductor 51 returns to its initial value. The bistable device still exhibits reliable operation when the diode isolation network is removed.

Since the inverter 2 and its input logic is the mirror image of the inverter 1 and its input logic, it will be appreciated that the next succeeding positive and negative going transients at the conductors 51 and 55 will turn the inverter 2 off and the inverter 1 on to change the D.-C. stable state of the device.

One application of the bistable device of FIG. 2, utilizing the component values set forth below, exhibited reliable operation at speeds in excess of 1 megacycle. Since the R-C time constants of the capacitors 11 and 12 can be selected to permit operation at desired high speeds, the ultimate maximum speed of operation is determined to a large extent by the speed of the transistors 1 and 2 and their logical input circuits.

It will be appreciated that the following component values are given only by way of example and that the invention is not to be limited thereby:

| | | Values |
|---|---|---|
| Resistors: | | |
| **16, 21** | ohms | 750 |
| **27, 31, 42, 45, 53** | k | 2 |
| **35, 49** | k | 5 |
| Capacitors: | | |
| **11, 12** | picofarads | 200 |

Figure 3:
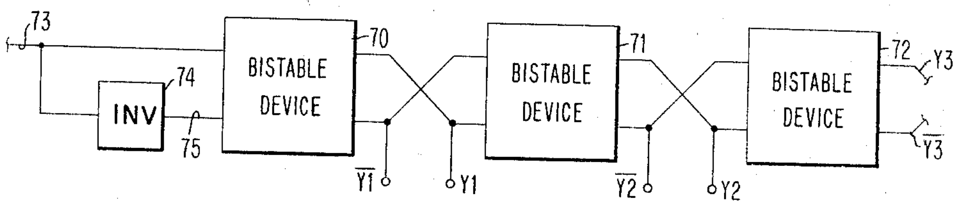
FIG. 3 shows a binary counter in diagrammatic form embodying the principles of the present invention.

FIG. 3 illustrates diagrammatically a three denomination binary counter including three bistable devices 70, 71 and 72 each of which is preferably of the type illustrated in FIG. 2. An input signal conductor 73 is connected directly to the device 70 and to an inverter 74. The inverter includes an output conductor 75 which provides a second complementary input to the bistable device 70. The conductors 73 and 75 correspond respectively to the conductors 51 and 55 of FIG. 2.

For purposes of explanation, it will be assumed that the positive and negative signal levels correspond respectively to the logical "1" and logical "0" conditions. It will be assumed further that positive pulses applied to the conductor 73 will be counted; and that the numerical value of the count stored can be read out from the output conductors Y1, $\overline{Y1}$, Y2, $\overline{Y2}$, Y3, $\overline{Y3}$. . . .

When the first positive pulse is applied to the conductor 73, to change the state of stage 70, the outputs Y1 and $\overline{Y1}$ will go positive and negative respectively, this condition being representative of the numeric value 1.

When the second positive pulse is applied to the conductor 73, Y1 and $\overline{Y1}$ will return to their original negative and positive levels respectively; and the positive going pulse on $\overline{Y1}$ changes the state of stage 71 to drive Y2 and $\overline{Y2}$ positive and negative respectively, this condition being representative of the numeric value 2.

The third pulse drives Y1 and $\overline{Y1}$ positive and negative again whereby Y1 and Y2 represent the numeric value 3.

The fourth pulse drives $\overline{Y1}$, $\overline{Y2}$ and Y3 positive and Y1, Y2 and $\overline{Y3}$ negative to represent the numeric value 4.

Thus it can be seen that the device of FIG. 3 operates as a binary counter with stages 70, 71 and 72 representing the first three binary denominations.

It will be appreciated that the transistor inverters 1 and 2 (FIG. 2) may be of the opposite conductivity type so long as the polarities of the diodes and the supply potentials are reversed.

The capacitors 11 and 12 can be connected between ground potential and the outputs of their respective AND circuits, but the preferred embodiment exhibits improved operation.

In FIG. 2, the switching of the state of the device can be made responsive to the trailing edge of the input pulse at conductor 51 by normally holding the conductors 51 and 55 positive and negative respectively and by driving them with negative and positive going pulses respectively.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a direct current coupled bistable device of the type in which a pair of alternatively energized amplifiers each include a logical input circuit and an output circuit crosscoupled to the input circuit of the other amplifier and in which each logical input circuit responds to a pair of bivalued complementary input signals to change the state of the device each time that the input signals change in one sense only from one set of values to the opposite, the combination therewith of a pair of capacitors each connected to a respective logical input circuit to integrate and thereby delay the change in value of one of said input signals in said one sense, thereby assuring turning off of the energized amplifier to initiated a change in the stable state of the device.

2. In a direct current coupled bistable device of the type in which a pair of alternatively energized amplifiers each include a logical input circuit and an output circuit crosscoupled to the input circuit of the other amplifier and in which each logical input circuit responds to a pair of bivalued complementary input signals to change the state of the device each time that the input signals change in one sense only from one set of values to the opposite, the combination therewith of a pair of capacitors each crosscoupled between the output circuit of a respective amplifier and the logical input circuit of the other amplifier to integrate and thereby delay the change in value of one of said input signals in said one sense, thereby assuring turning off of the energized amplifier to initiate a change in the stable state of the device.

3. A bistable device comprising a pair of amplifiers each having output and control terminals;

a pair of logical AND circuits for each amplifier, each AND circuit having two inputs and an output;

a logical OR circuit for each amplifier, each including a pair of inputs connected to the outputs of a respective pair of logical AND circuits and an output connected to the control terminal of its respective amplifier;

a pair of integrator capacitors;

the output terminal of each amplifier being coupled to one input of each logical AND circuit of the pair associated with the other amplifier and being connected to the output of a predetermined one of said latter pair of logical AND circuits by way of a respective one of said capacitors; and a pair of input terminals adapted to receive complemented bivalued input signals, one of the input terminals being connected to the other input of the predetermined logical AND circuit in each pair and the other input terminal being connected to the other input of the other logical AND circuit in each pair to change the stable state of the device in response to each change in one sense only of the input signals.

4. The bistable device of claim 3 together with a diode isolation network interposed between the one input terminal and its respective logical AND circuits to minimize output noise.

5. A bistable device comprising a pair of common emitter transistor amplifiers of the same conductivity type each having base, emitter and collector electrodes;

a pair of logical AND circuits for each amplifier, each AND circuit having two inputs and an output;

a logical OR circuit for each amplifier, each including a pair of inputs connected to the outputs of a respective pair of logical AND circuits and an output connected to the base electrode of its respective amplifier;

a pair of integrator capacitors;

the collector electrode of each amplifier being coupled to one input of each logical AND circuit of the pair associated with the other amplifier and being connected to the output of a predetermined one of said latter pair of logical AND circuits by way of a respective one of said capacitors; and a pair of input terminals adapted to receive complemented bivalued input signals, one of the input terminals being connected to the other input of the predetermined logical AND circuit in each pair and the other input terminal being connected to the other input of the other logical AND circuit in each pair to change the stable state of the device in response to each change in one sense only of the input signals.

6. The bistable device of claim 5 together with a collector bias means for each amplifier including a diode clamp limiting the collector voltage excursions and increasing the effectiveness of the capacitors.

7. A bistable device comprising a pair of common emitter transistor amplifiers of the same conductivity type each having base, emitter and collector electrodes;

a pair of logical AND circuits for each amplifier, each AND circuit having two inputs and an output;

a logical OR circuit for each amplifier, each including a pair of inputs connected to the outputs of a respective pair of logical AND circuits and an output connected to the base electrode of its respective amplifier;

the collector electrode of each amplifier being coupled to one input of each logical AND circuit of the pair associated with the other amplifier;

a pair of input terminals adapted to receive complemented bivalued input signals, one of the input terminals being connected to the other input of a first logical AND circuit in each pair and the other input terminal being connected to the other input of the second logical AND circuit in each pair; and means connected to each first logical AND circuit delaying any change in level at its output in response to each change in one sense of the input signal at said one terminal for initiating a change in the stable state of the device.

8. A bistable device comprising first and second common emitter transistor amplifiers of the same conductivity type each having base, emitter and collector electrodes;

first and second logical AND circuits for each amplifier, each AND circuit having first and second input diodes and an output;

a logical OR circuit for each amplifier, each including a pair of input diodes connected to the outputs of a respective first and second logical AND circuit and an output connected to the base electrode of the corresponding amplifier;

the collector electrode of each amplifier being coupled to the first diodes of the first and second logical AND circuits of the pair associated with the other amplifier;

a pair of input terminals adapted to receive complemented bivalued input signals, one of the input terminals being connected to the second diode of each first logical AND circuit and the other input terminal being connected to the second diode of each second logical AND circuit; and a pair of capacitors, each connected in parallel with a respective first diode of the first logical AND circuits, delaying bivalued changes in signal amplitude in one sense at the outputs of the first logical AND circuits in response to changes in said one sense of input signals values appearing at said one input terminal to initiate and insure completion of a change in the stable state of the device.

9. A binary counter comprising a plurality of bistable devices arranged in cascade form, each bistable device including a pair of common emitter transistor amplifiers of the same conductivity type each having base, emitter and collector electrodes;

a pair of logical AND circuits for each emplifier, each AND circuit having two inputs and an output;

a logical OR circuit for each amplifier, each including a pair of inputs connected to the outputs of a respective pair of logical AND circuits and an output connected to the base electrode of its respective amplifier;

a pair of integrator capacitors;

the collector electrode of each amplifier being coupled to one input of each logical AND circuit of the pair associated with the other amplifier and being connected to the output of a predetermined one of said latter pair of logical AND circuits by way of a respective one of said capacitors, the collector electrodes of each device forming complementary inputs to the next succeeding device; and a pair of input terminals adapted to receive complemented bivalued input signals, one of the input terminals being connected to the other input of the predetermined logical AND circuit in each pair and the other input terminal being connected to the other input of the other logical AND circuit in each pair to change the stable state of the device in response to each change in one sense only of the input signals.

References Cited by the Examiner

UNITED STATES PATENTS 3,104,327 9/1963 Rowe -------------- 307—88.5

OTHER REFERENCES

IBM Technical Disclosure Bulletin, vol. 5, No. 12, May 1963, "Complementary Output Circuit" by D. F. Busch; pp. 63–64.

IRE Wescon Record, Part, August 1957, "The Transistor Nor Circuit" by W. D. Rowe; pp. 237 and 245.

References Cited by the Applicant

UNITED STATES PATENTS 3,250,921 5/1966 Brette.

ARTHUR GAUSS, *Primary Examiner.*

J. ZAZWORSKY, *Assistant Examiner.*